March 17, 1931.  W. L. DENTON  1,796,983
COLLAR STUD
Filed April 7, 1930   2 Sheets-Sheet 1
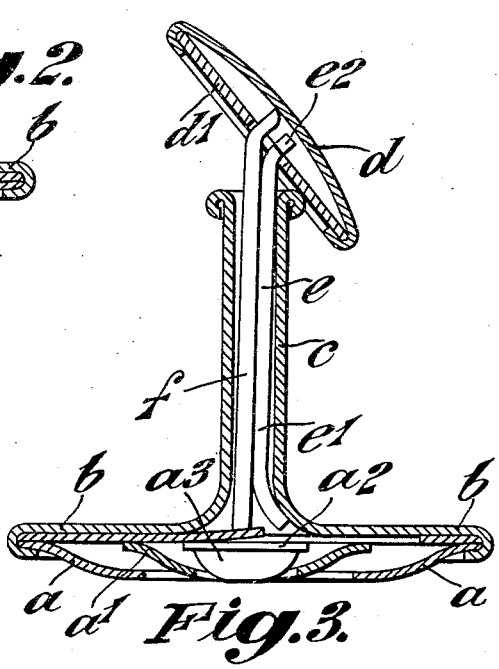

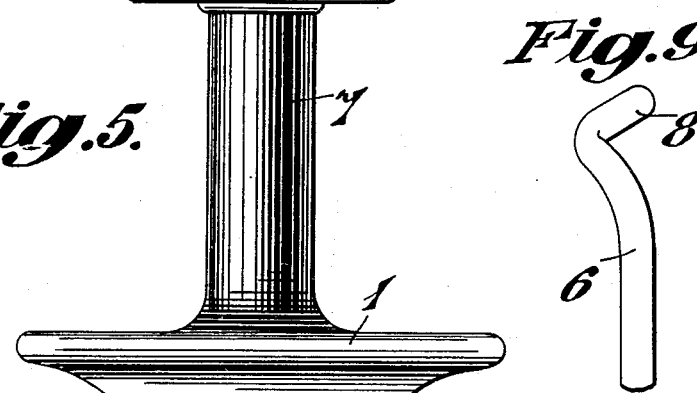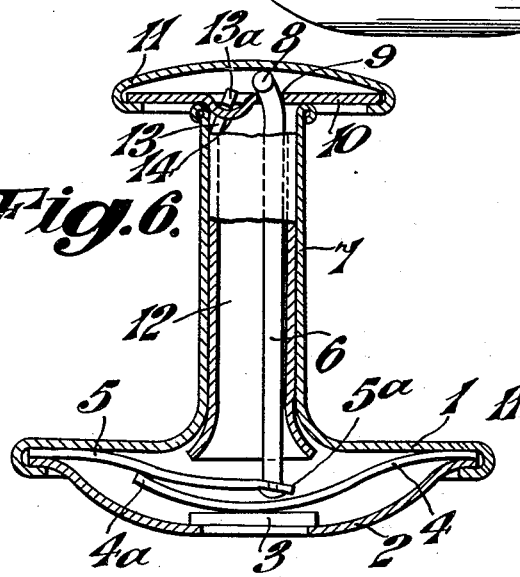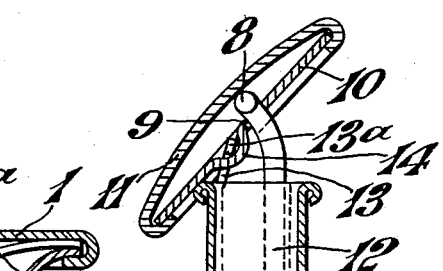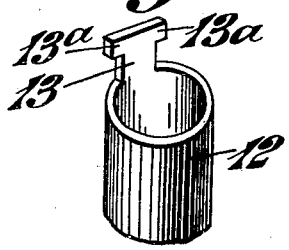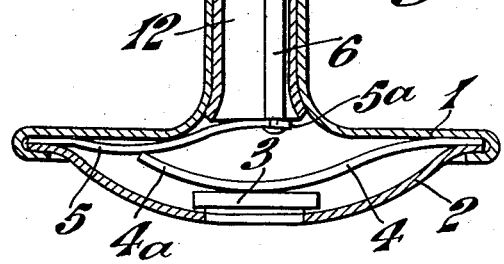

Patented Mar. 17, 1931

1,796,983

UNITED STATES PATENT OFFICE

WILLIAM LOFTIE DENTON, OF SOUTHWICK, ENGLAND

COLLAR STUD

Application filed April 7, 1930, Serial No. 442,390, and in Great Britain April 22, 1929.

This invention relates to collar studs in which the base of the stud has a relatively movable portion which can be moved to reduce the amount the periphery of the head overhangs the shank of the stud so as to facilitate insertion of the head of the stud into the usual collar holes, and is more particularly concerned with the type of stud in which the head is pivoted at the upper end of the shank of the stud and adapted to be moved about such pivot by endwise or axial movement of a member connecting the head to an operating device carried by the base of the stud. The object of my invention is to improve and simplify such construction of stud.

In order that my invention may be clearly understood and readily carried into effect I have appended hereto two sheets of drawings illustrating an embodiment thereof and wherein, Fig. 1 is an outside elevation view of the preferred form of my invention.

Fig. 2 is a sectional elevation view showing the normal condition of the stud.

Fig. 3 is a sectional elevation view showing the stud head tilted.

Fig. 4 shows in perspective the head and the members connected to it.

Fig. 5 is a side elevation view of a modified form of my invention in which the stud is in its normal condition.

Fig. 6 is a sectional elevation view of Fig. 5.

Fig. 7 is a sectional elevation view of the stud shown in Fig. 5 in the condition for insertion into or removal from a collar stud hole.

Fig. 8 is a detail perspective view of the upper end of a relatively slidable part of the stud shank shown in Fig. 5.

Fig. 9 is a perspective view of the upper end of the head raising member of the stud shown in Fig. 5.

Referring to Figs. 1 to 4 of the accompanying drawings the bottom of the base of the stud is composed of an annular plate $a$ secured at its periphery in the inturned rim of the flange $b$ constituting an integral base of a shank $c$, this annular plate supporting on its inner rim the periphery of a smaller diameter annular plate $a'$ in the centre of which is supported by a flange $a^2$ a small disc $a^3$ adapted to be pressed inwards with the part $a'$ relative to the part $a$ in order to effect a tilting action on the head $d$ of the stud.

The head $d$ is pivoted to the upper end of a metal strip $e$ slidable along the shank $c$ and bent as at $e'$ at its lower end to limit its sliding movement. The head $d$ can be pivoted to the strip $e$ by forming a lateral extension $c^2$ on the upper end of the strip $e$ to abut against the inner face of the plate $d'$ forming the base of the head, the strip $e$ being passed through a hole in the plate $d'$. The head $d$ is also pivoted in a like manner to the upper end of a strip $f$ lying close against the strip $e$ and pivotally connected at its lower end to a resilient tongue $g$ bent downwards from a part annular ring $h$ gripped between the base flange $b$ and the annular plate $a$. The spring tongue $g$ presses down against the small disc $a^3$ and pulls the head $d$ flat against the rim of the shank $c$, but when the small disc $a^3$ is pressed inwards the strip $f$ pushes the head at an inclined angle relative to the shank about the upper end of the strip $e$ which by its axial movement raises the point of pivot of the head $d$ away from the shank $c$ and allows the head to fold through nearly 90 degrees. The inner annular plate $a'$ is movable relative to the plate $a$ and thereby allows ample movement to be imparted to the strip $f$, the resilient tongue $g$ normally holding the parts $a$, $a'$ and $a^3$ flush against each other.

Referring to Figs. 5 to 9 of the drawings the base of the stud is fitted with a disc of any suitable material and the centre of this disc or as shown relatively movable plate 3 at the centre of the disc 2 can be pressed inwards against the lower of two strips 4 and 5 secured at one end to diametrically opposite points of the base 1, the arrangement being that the lower (4) of the said two strips is engaged by the said plate 3 at a point some distance from its free end 4a so that the free end 4a of the said strip has a fair amount of angular movement which is transmitted to the upper strip 5, the free end 4a of the strip 4 engaging the strip 5 as far from its free end as reasonably possible. By means of this arrangement the amount of movement imparted to the free end 5a of the strip 5 is greater than that imparted to the free end 4a of the lower strip 4 which latter point is also moved further than the movement imparted to the centre part 3 of the base 2, whereby a multiplying action is obtained. The free end 5a of the strip 5 has secured to it the lower end of a rod 6 passing through the shank 7 of the stud, and this rod is shaped at its upper end to provide a pivot pin 8 in the form of a lateral extension, the rod being passed through a hole 9 in the base 10 of the head 11 so as to pivotally connect the head 11 to the upper end of the rod 7.

The head normally lies flat on the top of the shank 7 under the downward pull of the rod 6 as shown in Fig. 6 but it is adapted to pivot to an angle as shown in Fig. 7. This can be effected by fitting a sleeve 12 inside the shank of the stud and forming a small lug like extension 13 on one side of the sleeve for engaging in a hole in the base 10 of the head 11 to provide the pivotal point. By this means slight pressure on the plate 3 movable in the base will slide the rod 6 through the shank of the stud, so that the head is folded to an angle to present a leading edge for insertion in a collar stud hole. The lug 13 of the sleeve 12 has lateral parts 13a which lie in depressions 14 in the base 10 of the head.

The fingers 4 and 5 can be pieces of wire bent to obtain the desired width.

Although I have shown the shank circular in cross section it is preferred to make the shank of flat sleeve like form to facilitate its insertion in a collar.

In describing my invention as applied to a collar stud it will be apparent that it can equally well be applied to stud like cuff links, and my invention is intended to also include stud like cuff links.

What I claim is:—

1. In a collar stud or stud like cuff links a relatively movable head hinged to the upper end of a strip slidable through the shank of the stud and also to the upper end of a further member relatively slidable in the shank, the lower end of the said strip being pivoted to a spring finger inside the base of the stud and operable from a relatively movable part of such base.

2. In a collar stud or stud like cuff links a relatively movable head pivoted at the upper end of the shank of the stud and adapted to be moved about such pivot by endwise or axial movement of a member connecting the head to an operating device carried by the base of the stud, said head being hinged to the upper end of a rod slidable through the shank of the stud and also to the upper end of a further member slidable relative to the shank, the lower end of the said rod being pivoted to a leverage multiplying device inside the base of the stud and operable from a relatively movable part of such base.

3. In a collar stud or stud like cuff links a relatively movable head pivoted at the upper end of the shank of the stud and adapted to be moved about such pivot by endwise or axial movement of a member connecting the head to an operating device carried by the base of the stud, said head being hinged to the upper end of a rod slidable through the shank of the stud and also to the upper end of a further member slidable relative to the shank, the lower end of the said rod being pivoted to a leverage multiplying device inside the base of the stud and operable from a relatively movable part of such base, said further slidable member comprising a slidable sleeve like member formed with a lug at its upper end whereby it is pivoted to the base of the head of the stud, said rod being slidable inside said sleeve like member.

4. In a collar stud or stud like cuff links a relatively movable head pivoted at the upper end of the shank of the stud and adapted to be moved about such pivot by endwise or axial movement of a member connecting the head to an operating device carried by the base of the stud, said head being hinged to the upper end of a rod slidable through the shank of the stud and also to the upper end of a further member slidable relative to the shank, the lower end of the said rod being pivoted to a leverage multiplying device inside the base of the stud and operable from a relatively movable part of such base, the lower end of said rod being pivoted to the free end of a spring finger, the other end of said finger being secured inside the base of the stud near its periphery, the said base accommodating a still further finger fixed at one end near the periphery of the base, its other end engaging said spring finger between its ends and being located between a relatively movable part of the base and the spring finger to which said rod is attached.

5. In a collar stud or stud like cuff links a head movable relative to the shank, a pair of parallel strips slidable inside the shank both connected pivotally at one end to the head, a spring finger in the base pivotally receiving the other end of one of said strips, the other strip being formed with an abutment adapted to engage the lower end of the interior of the shank to limit the movement of the head away from the shank, and a relatively movable centre part of the base of the stud engaged by said spring finger.

6. In a collar stud or stud like cuff links a head movable relative to the shank, a pair of parallel strips slidable inside the shank both connected pivotally at one end to the head, a spring finger in the base pivotally receiving the other end of one of said strips, the other strip being formed with an abutment adapted to engage the lower end of the interior of the shank to limit the movement of the head away from the shank, and a relatively movable centre part of the base of the stud engaged by said spring finger, said base comprising said relatively movable centre part, and two concentric surrounding annular parts the inner of which is movable relative to the outer part.

In witness hereof I have signed this specification.

WILLIAM LOFTIE DENTON.